(12) United States Patent
Hayman et al.

(10) Patent No.: US 8,544,436 B2
(45) Date of Patent: Oct. 1, 2013

(54) ENGINE ASSEMBLY INCLUDING CAMSHAFT WITH MULTIMODE LOBE

(75) Inventors: Alan W. Hayman, Romeo, MI (US); Robert S. McAlpine, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 12/962,914

(22) Filed: Dec. 8, 2010

(65) Prior Publication Data

US 2012/0145097 A1 Jun. 14, 2012

(51) Int. Cl.
*F01L 1/04* (2006.01)
(52) U.S. Cl.
USPC ........................ 123/90.6; 123/90.17
(58) Field of Classification Search
USPC .............. 123/90.1, 90.15–90.17, 90.6, 90.31, 123/21, 65 R, 58.8, 70 R, 316, 560, 568.14, 123/308, 432, 65 VD; 74/567
See application file for complete search history.

(56) References Cited

U.S. PATENT DOCUMENTS

| | | | |
|---|---|---|---|
| 3,924,576 A | 12/1975 | Siewert | |
| 4,506,633 A | 3/1985 | Britsch | |
| 5,217,229 A | 6/1993 | Jaime | |
| 6,286,467 B1 * | 9/2001 | Ancheta | 123/21 |
| 6,505,592 B1 | 1/2003 | Hayman et al. | |
| 7,028,648 B2 * | 4/2006 | Hasegawa et al. | 123/58.8 |
| 7,036,465 B2 * | 5/2006 | Burk et al. | 123/21 |
| 7,284,517 B2 * | 10/2007 | Lancefield et al. | 123/90.17 |
| 7,610,890 B2 * | 11/2009 | Lettmann et al. | 123/90.6 |
| 7,958,859 B2 * | 6/2011 | Methley et al. | 123/90.6 |
| 8,132,546 B2 * | 3/2012 | Surnilla | 123/21 |
| 2006/0112940 A1 | 6/2006 | Roberts et al. | |
| 2008/0201059 A1 | 8/2008 | Bryant | |
| 2008/0257104 A1 * | 10/2008 | Lancefield et al. | 74/568 R |
| 2009/0255492 A1 * | 10/2009 | Clever et al. | 123/90.6 |
| 2009/0308070 A1 | 12/2009 | Alger, II et al. | |
| 2012/0042649 A1 | 2/2012 | Kaneko et al. | |
| 2012/0048244 A1 | 3/2012 | Hayman et al. | |

FOREIGN PATENT DOCUMENTS

| | | |
|---|---|---|
| DE | 3007746 A1 | 9/1981 |
| DE | 69301470 T2 | 10/1996 |
| EP | 1167715 A2 | 1/2002 |
| WO | 2008031939 A2 | 3/2008 |

OTHER PUBLICATIONS

Hundleby, G.E., "Development of a Poppet-Valved Two-Stroke Engine—The Flagship Concept", Ricardo Consulting Engineers Ltd., SAE International Paper No. 900802, Feb. 1, 1990, 6 pgs.

* cited by examiner

*Primary Examiner* — Thomas E. Denion
*Assistant Examiner* — Daniel Bernstein
(74) *Attorney, Agent, or Firm* — Harness, Dickey & Pierce, P.L.C.

(57) ABSTRACT

An engine assembly may include an engine structure, a first valve, a first valve lift mechanism and a first camshaft. The engine structure may define a first combustion chamber and a first port in communication with the first combustion chamber. The first valve may be located in the first port and the first valve lift mechanism may be engaged with the first valve. The first camshaft may be rotationally supported on the engine structure and may include a first double lobe engaged with the first valve lift mechanism. The first double lobe may define a first valve opening region including a first peak and a second valve opening region including a second peak rotationally offset from the first peak.

17 Claims, 6 Drawing Sheets

ENGINE ASSEMBLY INCLUDING CAMSHAFT WITH MULTIMODE LOBE

FIELD

The present disclosure relates to engine camshaft arrangements including lobes having a multimode lobe.

BACKGROUND

This section provides background information related to the present disclosure which is not necessarily prior art.

Internal combustion engines may combust a mixture of air and fuel in cylinders and thereby produce drive torque. Intake ports direct air flow to the combustion chamber. Combustion of the air-fuel mixture produces exhaust gases. Exhaust ports transport exhaust gases from the combustion chamber.

SUMMARY

An engine assembly may include an engine structure, a first valve, a first valve lift mechanism and a first camshaft. The engine structure may define a first combustion chamber and a first port in communication with the first combustion chamber. The first valve may be located in the first port and the first valve lift mechanism may be engaged with the first valve. The first camshaft may be rotationally supported on the engine structure and may include a first double lobe engaged with the first valve lift mechanism. The first double lobe may define a first valve opening region including a first peak and a second valve opening region including a second peak rotationally offset from the first peak.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 2:
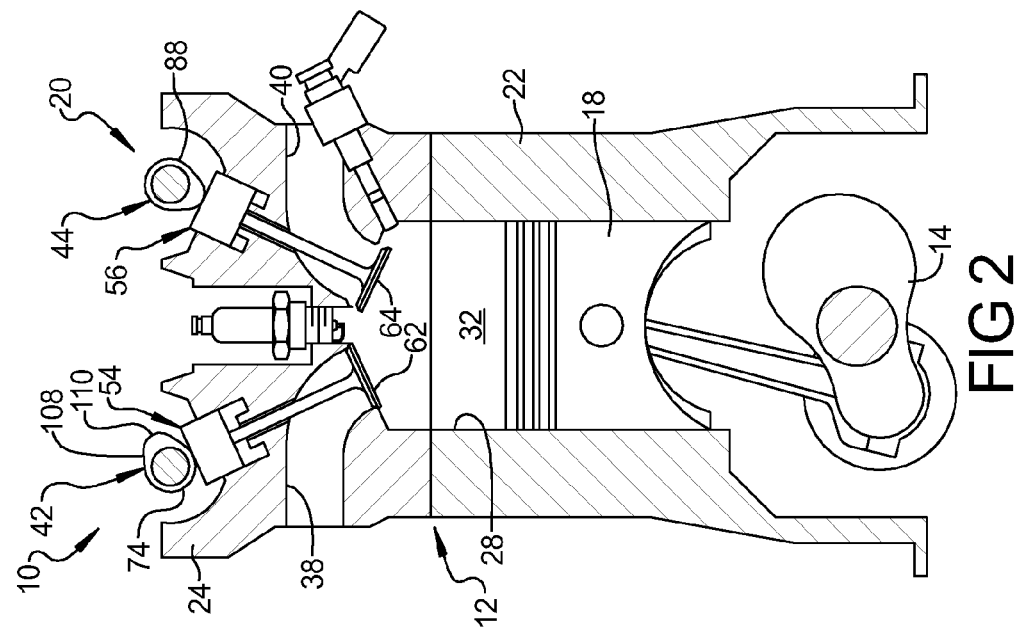
FIG. 2 is an additional section view of the engine assembly of FIG. 1.
Figure 1:
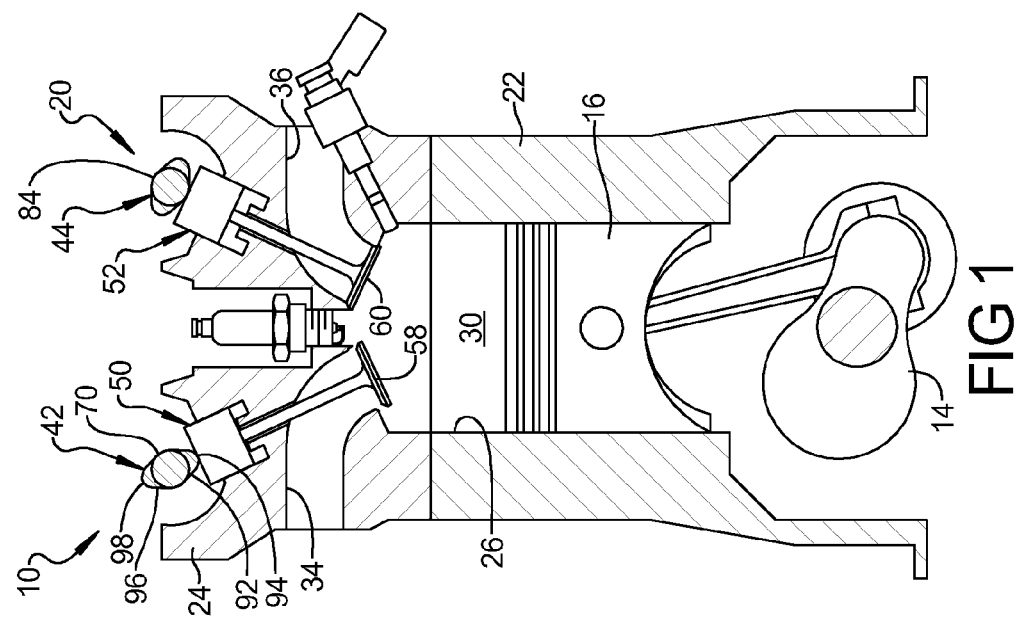
FIG. 1 is a section view of an engine assembly according to the present disclosure.

An engine assembly 10 is illustrated in FIGS. 1 and 2 and may include an engine structure 12, a crankshaft 14, first and second pistons 16, 18, and a valvetrain assembly 20. The engine structure 12 may include an engine block 22 and a cylinder head 24. The engine structure 12 may define first and second cylinder bores 26, 28. Two cylinders are illustrated for simplicity. However, it is understood that the present teachings apply to any number of piston-cylinder arrangements and a variety of reciprocating engine configurations including, but not limited to, V-engines, inline engines, and horizontally opposed engines, as well as both overhead cam (both single and dual overhead cam) and cam-in-block configurations.

The first piston 16 may be located in the first cylinder bore 26 and the second piston 18 may be located in the second cylinder bore 28. The cylinder head 24 cooperates with the first cylinder bore 26 and the first piston 16 to define a first combustion chamber 30 and cooperates with the second cylinder bore 28 and the second piston 18 to define a second combustion chamber 32. The engine structure 12 may define, first, second, third and fourth ports 34, 36, 38, 40 in the cylinder head 24. The first port 34 and the third port 38 may each form an exhaust port and the second port 36 and the fourth port 40 may each form an intake port. The first and second ports 34, 36 may be in communication with the first combustion chamber 30 and the third and fourth ports 38, 40 may be in communication with the second combustion chamber 32.

With reference to FIGS. 1-6, the valvetrain assembly 20 may include a first camshaft 42, a second camshaft 44, a first cam phaser 46, a second cam phaser 48, first, second, third and fourth valve lift mechanisms 50, 52, 54, 56, and first, second, third and fourth valves 58, 60, 62, 64. The first valve 58 may be located in the first port 34 and the first valve lift mechanism 50 may be engaged with the first valve 58. The second valve 60 may be located in the second port 36 and the second valve lift mechanism 52 may be engaged with the second valve 60. The third valve 62 may be located in the third port 38 and the third valve lift mechanism 54 may be engaged with the third valve 62. The fourth valve 64 may be located in the fourth port 40 and the fourth valve lift mechanism 56 may be engaged with the fourth valve 64. The first and third valves 58, 62 may form exhaust valves and the second and fourth valves 60, 64 may form intake valves.

The first camshaft 42 may be rotationally supported on the engine structure 12 and may include a first shaft 66, a second shaft 68, first and second double lobes 70, 72, and first and second single lobes 74, 76. The second shaft 68 may be supported for rotation within the first shaft 66. The first and second double lobes 70, 72 may be located on and fixed for rotation with the first shaft 66 and the first and second single lobes 74, 76 may be located on the first shaft 66 and fixed for rotation with the second shaft 68. By way of non-limiting example, the first and second single lobes 74, 76 may be fixed to the second shaft 68 by pins 78. Therefore, the first single lobe 74 and the second single lobe 76 may be rotatable relative to the first double lobe 70 and the second double lobe 72. The first cam phaser 46 may be coupled to the first camshaft 42 and may rotate the first and second shafts 66, 68, and therefore, the first and second double lobes 70, 72 and the first and second single lobes 74, 76, relative to one another.

Similarly, the second camshaft 44 may be rotationally supported on the engine structure 12 and may include a first shaft 80, a second shaft 82, first and second double lobes 84, 86, and first and second single lobes 88, 90. The second shaft 82 may be supported for rotation within the first shaft 80. The first and second double lobes 84, 86 may be located on and fixed for rotation with the first shaft 80 and the second first and second single lobes 88, 90 may be located on the first shaft 80 and fixed for rotation with the second shaft 82. By way of non-limiting example, the first and second single lobes 88, 90 may be fixed to the second shaft 82 by the pins 91. Therefore, the first single lobe 88 and the second single lobe 90 may be rotatable relative to the first double lobe 84 and the second double lobe 86. The second cam phaser 48 may be coupled to the second camshaft 44 and may rotate the first and second shafts 80, 82 and therefore, the first and second double lobes 84, 86 and the first and second single lobes 88, 90 relative to one another.

The first double lobes 70, 84 and the second double lobes 72, 86 may be similar to one another. Therefore, the first double lobe 70 will be described with the understanding that the description applies equally to the first double lobe 84 and the second double lobes 72, 86. The first single lobes 74, 88 and the second single lobes 76, 90 may also be similar to one another. Therefore, the first single lobe 74 will be described with the understanding that the description applies equally to the first single lobe 88 and the second single lobes 76, 90.

Figure 3:
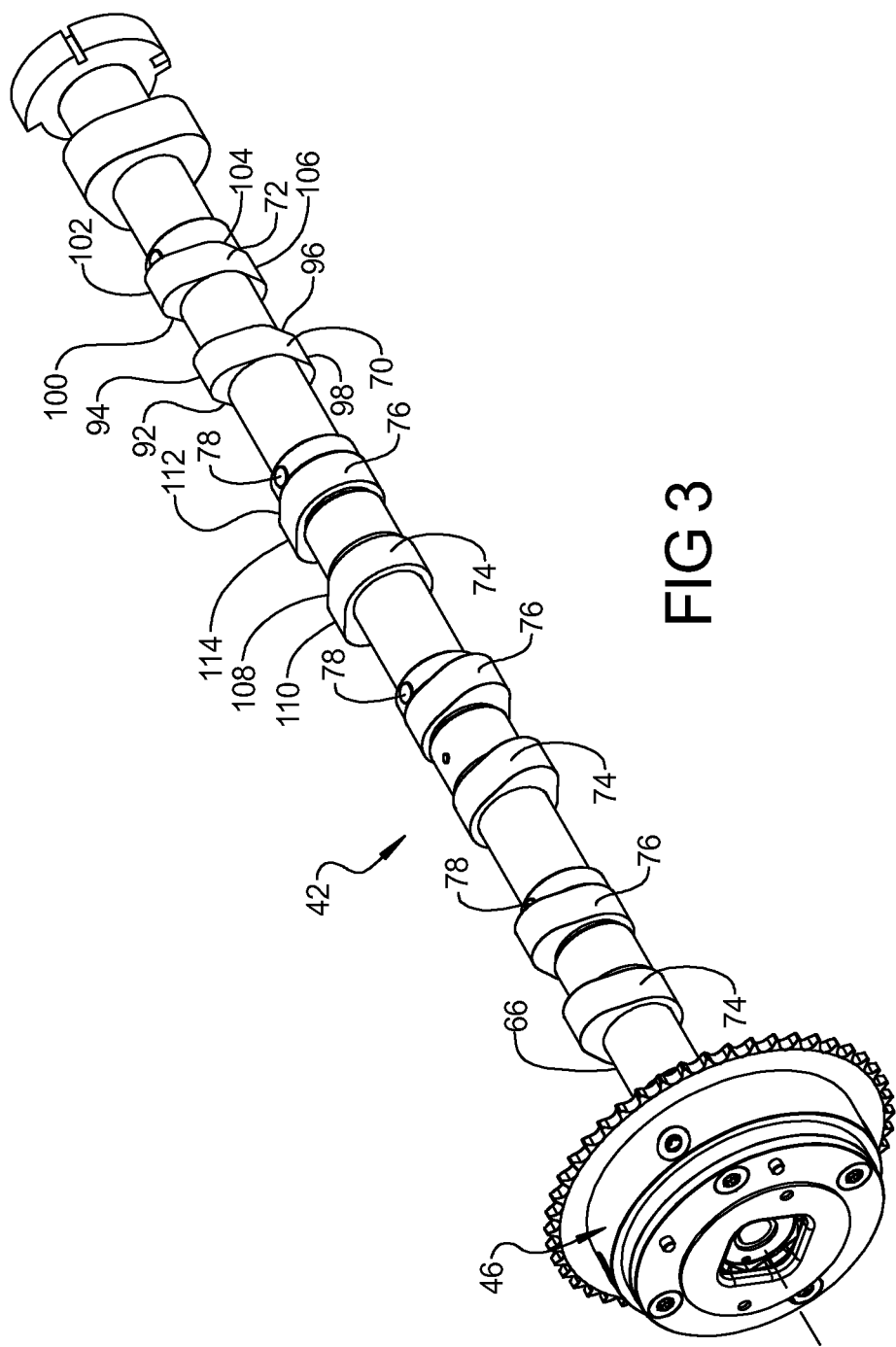
FIG. 3 is a perspective view of a first camshaft shown in FIGS. 1 and 2.
Figure 4:
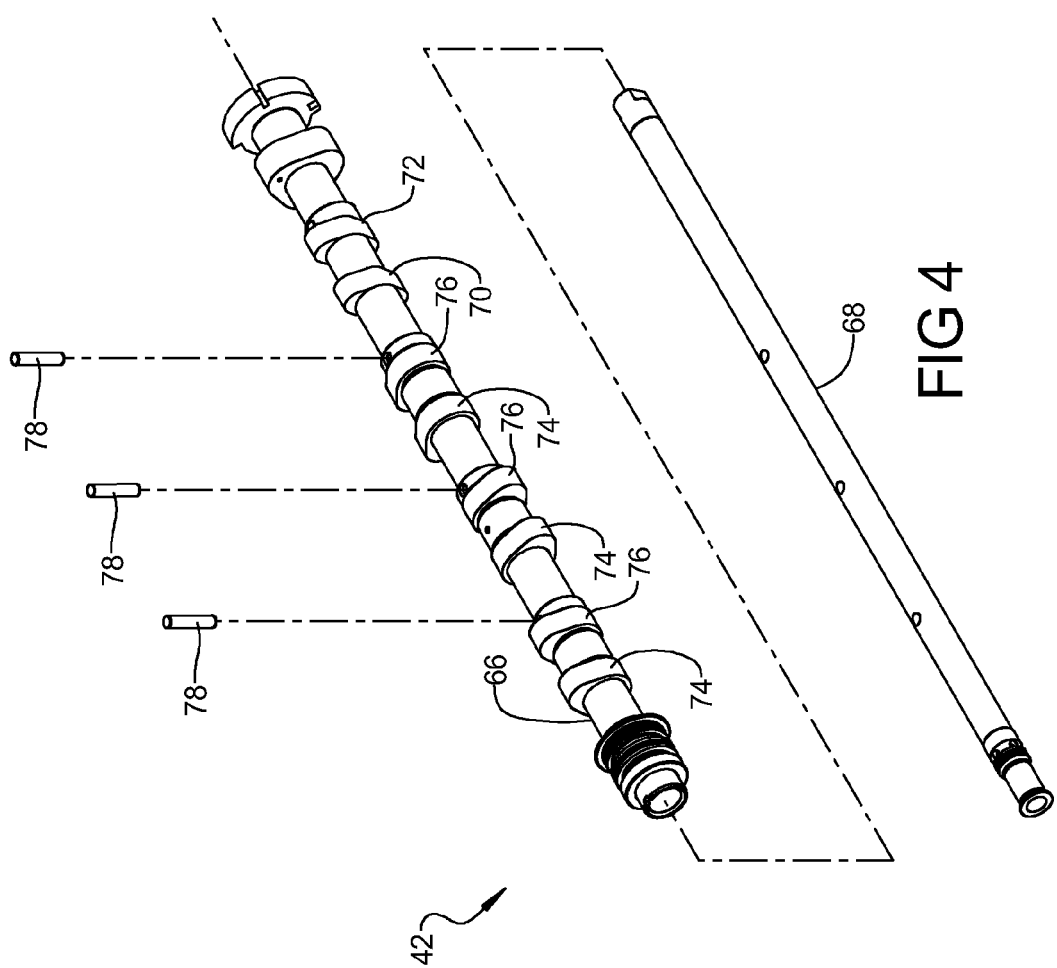
FIG. 4 is an exploded perspective view of the first camshaft of FIG. 3.
Figure 5:
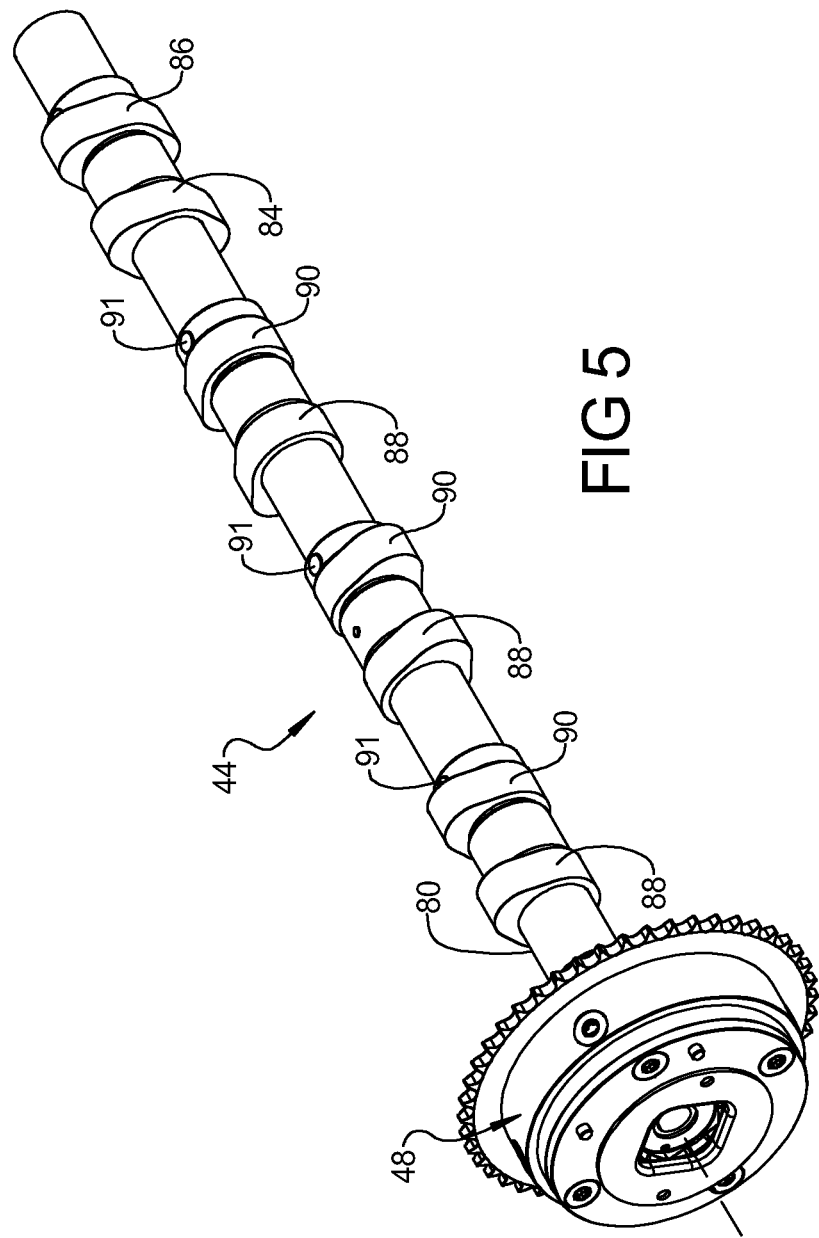
FIG. 5 is a perspective view of a second camshaft shown in FIGS. 1 and 2.
Figure 6:
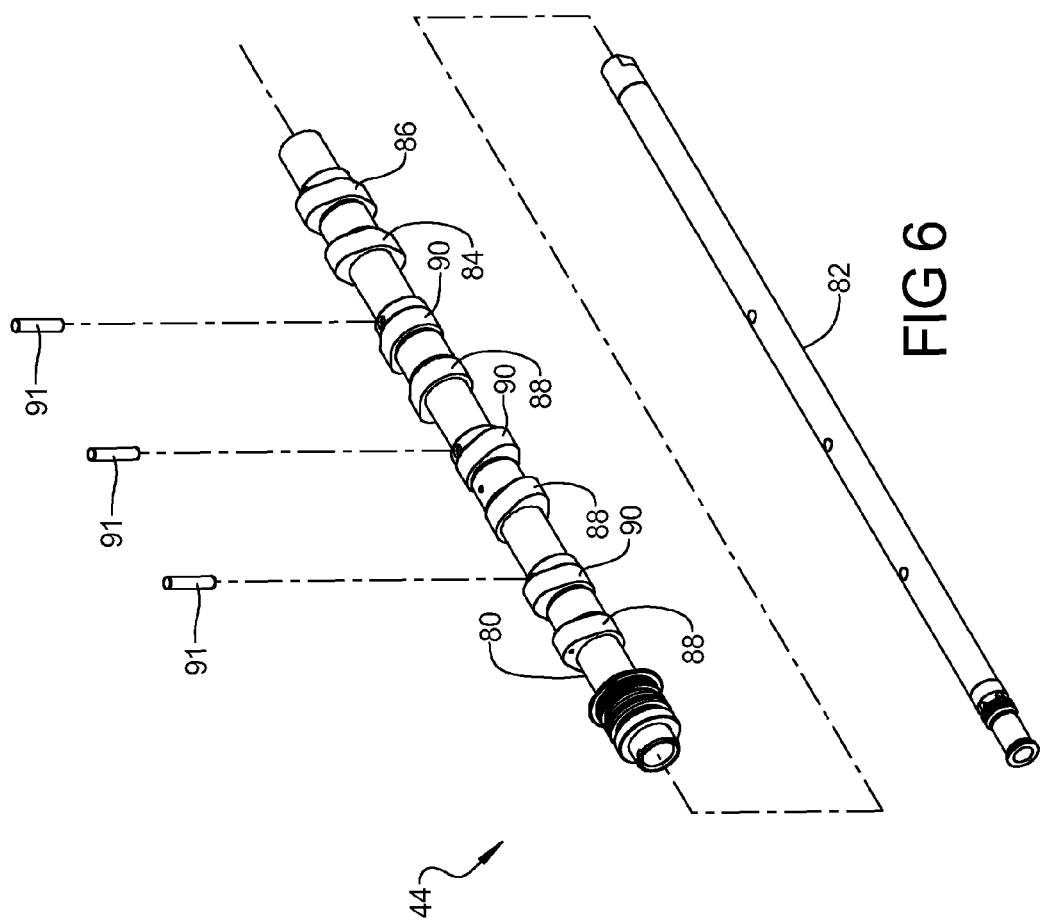
FIG. 6 is an exploded perspective view of the second camshaft of FIG. 5.

As seen in FIGS. 1, 3 and 4, the first double lobe 70 may define a first valve opening region 92 including a first peak 94 and a second valve opening region 96 including a second peak 98. The second peak 98 may be rotationally offset from the first peak 94. In the present non-limiting example, the first and second peaks 94, 98 extend in opposite radial directions from one another. Similarly, the second double lobe 72 may define a third valve opening region 100 including a third peak 102 and a fourth valve opening region 104 including a fourth peak 106. The fourth peak 106 may be rotationally offset from the third peak 102. In the present non-limiting example, the third and fourth peaks 102, 106 extend in opposite radial directions from one another.

As seen in FIGS. 2, 3 and 4, the first single lobe 74 may define a single valve opening region 108 including a single peak 110. Similarly, the second single lobe 76 may define a single valve opening region 112 including a single peak 114.

Figure 7:
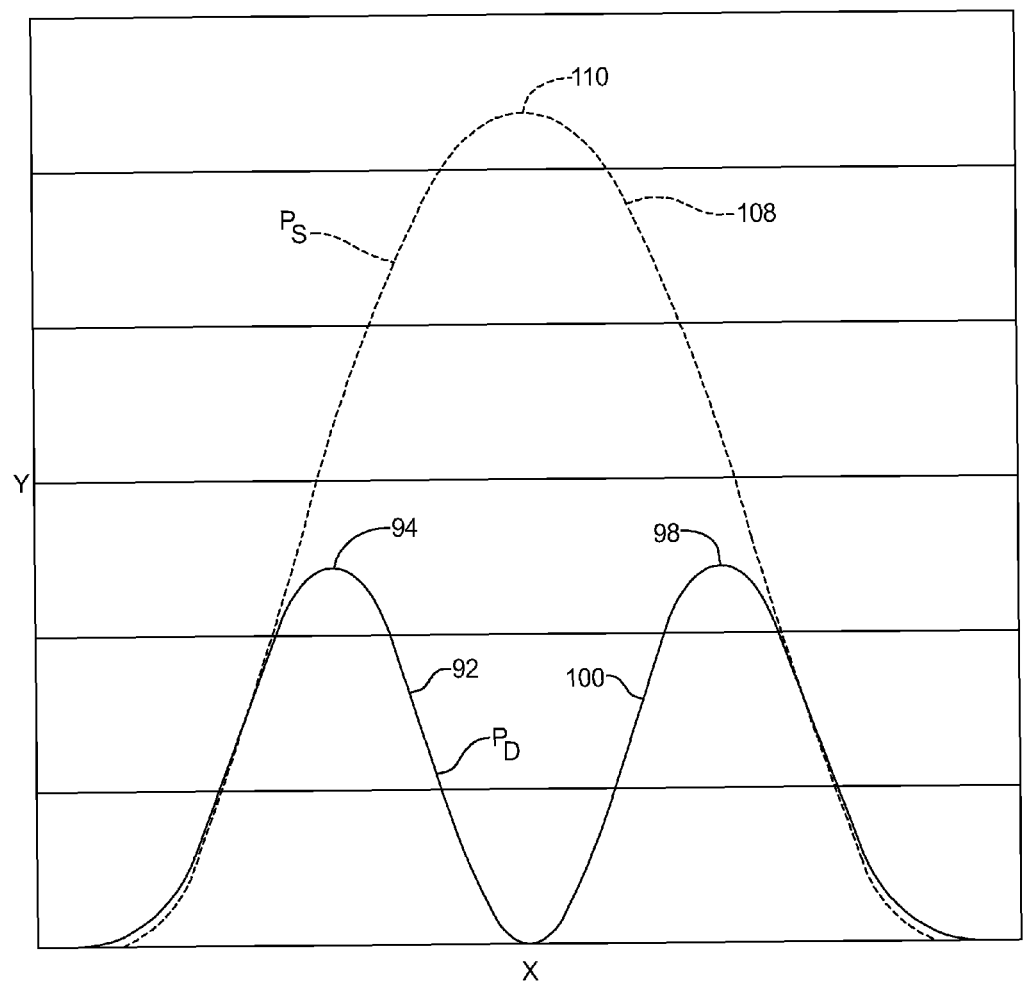
FIG. 7 is a graphical illustration of valve opening profiles associated with the camshaft of FIGS. 3 and 4.

FIG. 7 graphically illustrates a non-limiting example of the valve opening profile ($P_D$) provided by the first valve opening region 92 of the first double lobe 70 relative to the valve opening profile ($P_S$) provided by the single valve opening region 108 of the first single lobe 74. In FIG. 7, the x-axis represents opening duration and the y-axis represents lift height. The single valve opening region 108 of the first single lobe 74 may define a greater valve opening duration than the first valve opening region 92 of the first double lobe 70. The single valve opening region 108 may also define a greater valve opening duration than the second valve opening region 96 of the first double lobe 70.

The single peak 110 of the first single lobe 74 may define a greater valve lift than the first peak 94 of the first double lobe 70. The single peak 110 of the first single lobe 74 may also define a greater valve lift than the second peak 98 of the first double lobe 70. By way of non-limiting example, the single peak 110 may define a greater outward radial extent than the first and second peaks 94, 98.

In the present non-limiting example, the first combustion chamber 30 may form a two-stroke operating cycle combustion chamber having one combustion event per crankshaft revolution. The second combustion chamber 32 may form a four-stroke operating cycle combustion chamber having one combustion event per two crankshaft revolutions. The first and second double lobes 70, 72 and the first and second single lobes 74, 76 may each form an exhaust lobe and the first and second double lobes 84, 86 and the first and second single lobes 88, 90 may each form an intake lobe. The first port 34 may form an exhaust port and may be in communication with the second combustion chamber 32. The exhaust gas from the first combustion chamber 30 may be provided to the second combustion chamber 32 for a subsequent combustion event.

What is claimed is:

1. A camshaft including a first double lobe that engages a first valve lift mechanism and defines a first valve opening region including a first peak and a second valve opening region including a second peak rotationally offset from the first peak; and a first single lobe that engages a second valve lift mechanism separate from the first valve lift mechanism and defines a single valve opening region including a single peak, wherein the first single lobe is rotatable relative to the first double lobe.

2. The camshaft of claim 1, wherein the single valve opening region of the first single lobe defines a greater valve opening duration than the first valve opening region of the first double lobe.

3. The camshaft of claim 1, wherein the single peak of the first single lobe defines a greater valve lift than the first peak of the first double lobe.

4. The camshaft of claim 1, wherein the first double lobe is an intake lobe.

5. The camshaft of claim 1, wherein the first double lobe is an exhaust lobe.

6. The camshaft of claim 1, further comprising a second double lobe defining a third valve opening region including a third peak and a fourth valve opening region including a fourth peak rotationally offset from the third peak.

7. The camshaft of claim 1, wherein the first and second peaks extend in opposite radial directions from one another.

8. An engine assembly comprising:
an engine structure defining a first combustion chamber and a first intake port in communication with the first combustion chamber;
a first intake valve located in the first port;
a first intake valve lift mechanism engaged with the first intake valve; and
a first camshaft rotationally supported on the engine structure, including a first double lobe engaged with the first intake valve lift mechanism and defining a first valve opening region including a first peak and a second valve opening region including a second peak rotationally offset from the first peak, wherein the first combustion chamber operates as a full time two-stroke operating cycle combustion chamber; and
a second intake valve and a second intake valve lift mechanism engaged with the second intake valve, the engine structure defining a second combustion chamber and a second port having the second valve located therein and in communication with the second combustion chamber, the first camshaft defining a first single lobe engaged with the second intake valve lift mechanism and defining a single valve opening region including a single peak, wherein the second combustion chamber operates as a full time four-stroke operating cycle combustion chamber.

9. An engine assembly comprising:
an engine structure defining a first combustion chamber and a first port in communication with the first combustion chamber;
a first valve located in the first port;
a first valve lift mechanism engaged with the first valve; and
a first camshaft rotationally supported on the engine structure, including a first double lobe engaged with the first valve lift mechanism and defining a first valve opening region including a first peak and a second valve opening region including a second peak rotationally offset from the first peak;
further comprising a second valve and a second valve lift mechanism engaged with the second valve, the engine structure defining a second combustion chamber and a second port having the second valve located therein and in communication with the second combustion chamber, the first camshaft defining a first single lobe engaged with the second valve lift mechanism and defining a single valve opening region including a single peak; and wherein the first single lobe is rotatable relative to the first double lobe.

10. The engine assembly of claim 9, wherein the single valve opening region of the first single lobe defines a greater valve opening duration than the first valve opening region of the first double lobe.

11. The engine assembly of claim 9, wherein the single peak of the first single lobe defines a greater valve lift than the first peak of the first double lobe.

12. The engine assembly of claim 9, wherein the first port forms an exhaust port and is in communication with the second combustion chamber to provide exhaust gas from the first combustion chamber to the second combustion chamber.

13. The engine assembly of claim 9, wherein the first combustion chamber defines a two-stroke operating cycle combustion chamber and the second combustion chamber defines a four-stroke operating cycle combustion chamber.

14. The engine assembly of claim 9, wherein the first and second peaks extend in opposite radial directions from one another.

15. The engine assembly of claim 9, wherein the first port forms an exhaust port.

16. The engine assembly of claim 9, wherein the first camshaft includes a second double lobe defining a third valve opening region including a third peak and a fourth valve opening region including a fourth peak rotationally offset from the third peak.

17. An engine assembly comprising:
an engine structure defining a first combustion chamber forming a full-time two-stroke operating cycle combustion chamber, a first port in communication with the first combustion chamber, a second combustion chamber forming a full-time four-stroke operating cycle combustion chamber and a second port in communication with the second combustion chamber;
a first valve located in the first port;
a first valve lift mechanism engaged with the first valve;
a second valve located in the second port;
a second valve lift mechanism engaged with the second valve; and
a first camshaft rotationally supported on the engine structure and including a first double lobe engaged with the first valve lift mechanism and a first single lobe engaged with the second valve lift mechanism, the first double lobe defining a first valve opening region including a first peak and a second valve opening region including a second peak rotationally offset from the first peak and the first single lobe defining a single valve opening region including a single peak.

* * * * *